(12) United States Patent
Iwazaki et al.

(10) Patent No.: US 11,258,346 B2
(45) Date of Patent: Feb. 22, 2022

(54) POWER CONVERSION DEVICE AND HARMONIC RESTRAINT DEVICE

(71) Applicant: Mitsubishi Electric Corporation, Tokyo (JP)

(72) Inventors: Kenji Iwazaki, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/328,306

(22) PCT Filed: Oct. 28, 2016

(86) PCT No.: PCT/JP2016/082113
§ 371 (c)(1),
(2) Date: Feb. 26, 2019

(87) PCT Pub. No.: WO2018/078807
PCT Pub. Date: May 3, 2018

(65) Prior Publication Data
US 2019/0245429 A1    Aug. 8, 2019

(51) Int. Cl.
| H02M 1/12 | (2006.01) |
| H02M 1/088 | (2006.01) |
| H02M 7/5387 | (2007.01) |
| H02J 3/01 | (2006.01) |
| H02M 1/00 | (2006.01) |

(52) U.S. Cl.
CPC ............. *H02M 1/12* (2013.01); *H02J 3/01* (2013.01); *H02M 1/088* (2013.01); *H02M 7/53871* (2013.01); *H02M 1/0003* (2021.05)

(58) Field of Classification Search
CPC ..... H02M 1/12; H02M 2001/0003; H02J 1/02
See application file for complete search history.

(56) References Cited

U.S. PATENT DOCUMENTS 6,377,479 B1 * 4/2002 Ayano ............... H02M 1/12
363/39
8,854,089 B2 * 10/2014 Chen ................. H03K 3/353
326/83
(Continued)

FOREIGN PATENT DOCUMENTS

JP    H03-203520 A    9/1991
JP    H11-275761 A    10/1999
(Continued)

OTHER PUBLICATIONS

International Search Report of the International Searching Authority dated Jan. 17, 2017 for the corresponding International application No. PCT/JP2016/082113 (and English translation).
(Continued)

*Primary Examiner* — Peter M Novak
(74) *Attorney, Agent, or Firm* — Posz Law Group, PLC

(57) ABSTRACT

A power converter is configured to convert, into an AC voltage, a DC voltage supplied from a DC power supply connected between a first power supply wiring and a first ground wiring. A control device is connected between a second power supply wiring and a second ground wiring. The second power supply wiring is configured to supply a second power supply voltage lower than the first power supply voltage. The control device is configured to control the power converter. A separation device is configured to separate the first ground wiring and the second ground wiring from each other. The first ground wiring and the second ground wiring are electrically connected to each other at a single node.

7 Claims, 6 Drawing Sheets

(56) References Cited

U.S. PATENT DOCUMENTS

| | | | |
|---|---|---|---|
| 2008/0035954 A1 | 2/2008 | Nozaki | |
| 2009/0109588 A1* | 4/2009 | Hayama | H03K 17/687 361/93.1 |
| 2011/0080149 A1* | 4/2011 | Fukuta | H02M 1/36 323/284 |
| 2015/0280602 A1* | 10/2015 | Ichihara | H02M 1/12 363/37 |
| 2018/0248371 A1* | 8/2018 | Chae | H02J 3/01 |

FOREIGN PATENT DOCUMENTS

| | | |
|---|---|---|
| JP | 2004-304926 A | 10/2004 |
| JP | 2008-042126 A | 2/2008 |
| JP | 2015-049104 A | 3/2015 |

OTHER PUBLICATIONS

Office Action dated Apr. 7, 2020 issued in corresponding JP patent application No. 2018-547038 (and English translation).
Office Action dated Jul. 1, 2020 in counterpart CN patent application No. 201680090160.7 (and English Machine translation).
Office Action dated Nov. 24, 2020 in counterpart JP patent application No. 2018-547038 (and English Machine translation).
Chinese Office Action dated Feb. 25, 2021, issued in corresponding Chinese Patent Application No. 201680090160.7 (and English Machine Translation).
Japanese Office Action dated Nov. 24, 2021, issued in corresponding JP Patent Application No. 2018-547038 (and English Machine Translation).

* cited by examiner

POWER CONVERSION DEVICE AND HARMONIC RESTRAINT DEVICE

CROSS REFERENCE TO RELATED APPLICATION

This application is a U.S. national stage application of PCT/JP2016/082113 filed on Oct. 28, 2016, the contents of which are incorporated herein by reference.

TECHNICAL FIELD

The present invention relates to a power conversion device, a harmonic restraint device, and a harmonic current compensation.

BACKGROUND ART

A harmonic restraint device generally connects to a load, and cancels a harmonic component by supplying a power system with a compensation current having a phase opposite to that of a harmonic current generated by the load. In the harmonic restraint device, a controller extracts the harmonic component of the current flowing in the load (hereinafter referred to as "load current"), and generates a compensation current command for generating a compensation current having a phase opposite to that of the extracted harmonic component.

In order to generate the compensation current command, the harmonic component has to be extracted precisely from the load current. However, if noise is introduced into a current detector for detecting the load current, precision in extracting the harmonic component is decreased. Therefore, it becomes difficult to cancel the harmonic component.

Moreover, in the harmonic restraint device, an inverter circuit for generating the compensation current is used. In order to output the compensation current that can cancel the harmonic component, the inverter circuit is required to output an AC voltage higher than a system voltage. Accordingly, in the harmonic restraint device, voltage of a DC bus connected between a capacitor serving as a DC power supply and a DC side terminal of the inverter circuit needs to be maintained at a voltage higher than the effective value of the system voltage. In order to maintain the bus voltage at a certain voltage, the bus voltage is required to be accurately detected.

However, a multiplicity of noises including switching noise are generated from the inverter circuit that handles high voltage and a large amount of current, with the result that noise is introduced into the voltage detector for detecting the bus voltage. This may lead to decreased detection precision of the voltage detector.

In order to address the influences of the noises described above, in a harmonic restraint device of Japanese Patent Laying-Open No. 3-203520 (Patent Literature 1), in an analog amplifying circuit configured to perform analog amplification of a compensation current command from a harmonic current compensation arithmetic circuit and to output it as a compensation current, a photo coupler is coupled between a circuit for sending the compensation current command and a circuit for outputting the compensation current so as to achieve electric isolation between both the circuits.

Moreover, in Japanese Patent Laying-Open No. 11-275761 (Patent Literature 2), in a controller for controlling charging and discharging of a capacitor in a harmonic restraint device, an isolated amplifier for amplifying a voltage between terminals of the capacitor is used as a voltage detector for detecting the voltage between the terminals. Accordingly, electric isolation between the capacitor and the controller is secured.

CITATION LIST

Patent Literature

PTL 1: Japanese Patent Laying-Open No. 3-203520
PTL 2: Japanese Patent Laying-Open No. 11-275761

SUMMARY OF INVENTION

Technical Problem

According to the technique described in each of Patent Literatures 1 and 2 above, the inverter circuit and the voltage detector are substantially electrically isolated from each other, thereby restraining noise from being introduced from the inverter circuit to the voltage detector, the controller, and the like. On the other hand, the reference potential of the inverter circuit and the reference potential of the controller are separated from each other, with the result that a potential difference may occur between the two reference potentials.

When the electric potential difference occurs between the two reference potentials, the harmonic restraint device cannot be operated normally as a whole, with the result that it may become difficult to maintain the bus voltage at a certain voltage. As a result, the harmonic restraint device cannot output the compensation current that can cancel the harmonic component, with the result that harmonic restraint performance may be decreased.

The present invention has been made to solve the above-described problem, and has an object to provide a technique by which performance as a harmonic restraint device can be secured in a power conversion device.

Solution to Problem

A power conversion device according to a certain aspect of the present invention includes a DC power supply, a power converter, a control device, and a separation device. The DC power supply is connected between a first power supply wiring and a first ground wiring. The power converter is configured to convert, into an AC voltage, a first power supply voltage between the first power supply wiring and the first ground wiring. The control device is connected between a second power supply wiring and a second ground wiring, the second power supply wiring being configured to supply a second power supply voltage lower than the first power supply voltage. The control device is configured to control the power converter. The separation device is configured to separate the first ground wiring and the second ground wiring from each other. The first ground wiring is electrically connected to the second ground wiring at a single node.

Advantageous Effects of Invention

According to the present invention, performance as a harmonic restraint device can be secured in a power conversion device.

DESCRIPTION OF EMBODIMENTS

Figure 1:
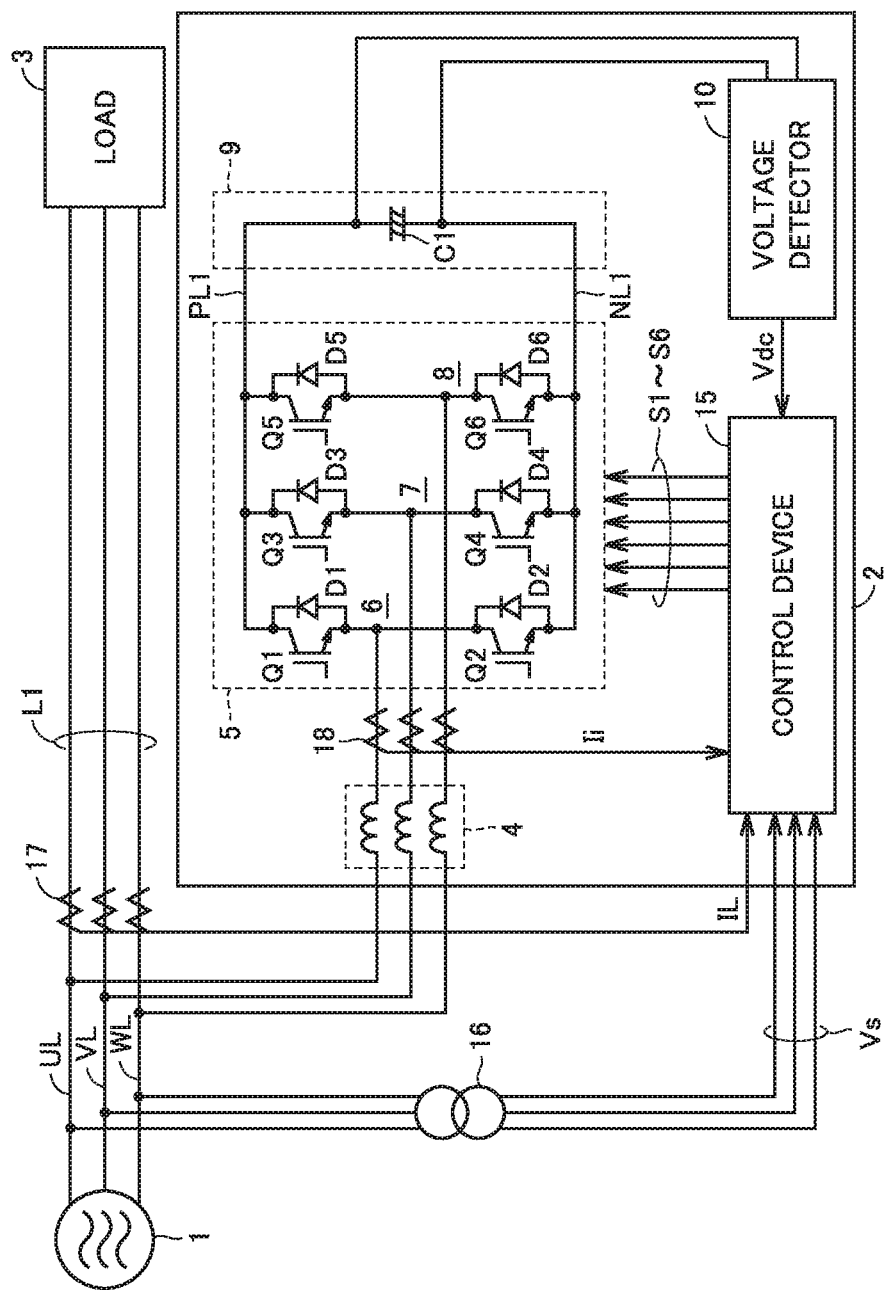
FIG. 1 is a circuit diagram showing a configuration of a power conversion device according to a first embodiment of the present invention.

The following describes embodiments of the present invention with reference to figures in detail. It should be noted that the same or corresponding portions in the figures are given the same reference characters and are not described repeatedly.

First Embodiment

FIG. 1 is a circuit diagram showing a configuration of a power conversion device according to a first embodiment of the present invention. A power conversion device 2 according to the first embodiment is applicable to a harmonic restraint device, for example.

With reference to FIG. 1, an AC power supply 1 is representatively an AC 100V or AC 200V commercial system power supply. AC power supplied from AC power supply 1 is supplied to a load 3 via a power system L1. Load 3 includes a power conversion device such as an inverter, and can generate a harmonic current. If the generated harmonic current is leaked from load 3 to power system L1, power quality of power system L1 may be deteriorated.

Power conversion device 2 is connected to load 3, and is configured to supply power system L1 with a compensation current having a phase opposite to that of the harmonic current generated by load 3. Accordingly, the harmonic current generated from load 3 is canceled, so that current waveform of power system L1 is compensated, thus obtaining a sinusoidal wave.

Specifically, power conversion device 2 includes a reactor 4, a power converter 5, a power supply wiring PL1, a ground wiring NL1, a DC power supply 9, a voltage detector 10, a current detector 18, and a control device 15.

DC power supply 9 is connected between power supply wiring PL1 and ground wiring NL1. DC power supply 9 is a power storage device, and includes an electric double layer capacitor C1, for example. DC power supply 9 may include a secondary battery such as a lithium ion secondary battery and a nickel-metal hydride battery. Alternatively, DC power supply 9 may include: a power storage device; and a converter configured to step up or step down a DC voltage output from the power storage device.

DC power supply 9 holds a DC voltage (for example, a DC voltage higher than 100 V) Vdc higher than a DC voltage corresponding to the amplitude of an AC voltage in power system L1. In the description below, DC voltage Vdc will be also referred to as power supply voltage Vdc. In the first embodiment, DC voltage (power supply voltage) Vdc corresponds to a "first power supply voltage", power supply wiring PL1 corresponds to a "first power supply wiring", and ground wiring NL1 corresponds to a "first ground wiring".

Power converter 5 is connected between power system L1 and each of power supply wiring PL1 and ground wiring NL1. Power converter 5 converts, into AC voltage, DC voltage Vdc between power supply wiring PL1 and ground wiring NL1, and supplies it to power system L1. Power system L1 has a U phase, a V phase, and a W phase, and includes three power lines (a U phase line UL, a V phase line VL, and a W phase line WL).

Power converter 5 is a three-phase inverter, and includes a U phase arm 6, a V phase arm 7, and a W phase arm 8, for example. Each phase arm includes two semiconductor switching elements and two diodes. In the present embodiment, an IGBT (Insulated Gate Bipolar Transistor) is used as each semiconductor switching element. Examples of a material of the semiconductor switching element may include not only Si (silicon) but also a wide gap semiconductor such as SiC (silicon carbide), GaN (gallium nitride), and C (diamond).

U phase arm 6 includes IGBT elements Q1, Q2 and diodes D1, D2. IGBT elements Q1, Q2 are connected in series between power supply wiring PL1 and ground wiring NL1. Diodes D1, D2 are connected to IGBT elements Q1, Q2 in anti-parallel, respectively.

V phase arm 7 includes IGBT elements Q3, Q4 and diodes D3, D4. IGBT elements Q3, Q4 are connected in series between power supply wiring PL1 and ground wiring NL1. Diodes D3, D4 are connected to IGBT elements Q3, Q4 in anti-parallel, respectively.

W phase arm 8 includes IGBT elements Q5, Q6 and diodes D5, D6. IGBT elements Q5, Q6 are connected in series between power supply wiring PL1 and ground wiring NL1. Diodes D5, D6 are connected to IGBT elements Q5, Q6 in anti-parallel, respectively. An intermediate point of each phase arm of power converter 6 (connection point of each IGBT element) is connected to a corresponding phase line of power system L1 via reactor 4.

A current detector 17 detects an alternating current (load current) IL flowing from power system L1 to load 3, and outputs, to control device 15, a signal indicating a detection value thereof. A current detector 18 detects an alternating current (inverter current) Ii flowing between power system L1 and power converter 5, and outputs, to control device 15, a signal indicating a detection value thereof.

Voltage detector 10 detects a voltage (corresponding to a DC voltage between power supply wiring PL1 and ground wiring NL1) Vdc across capacitor C1, and outputs, to control device 15, a signal indicating a detection value thereof. A detailed configuration of voltage detector 10 will be described later. DC voltage Vdc is a high voltage, such as a voltage of more than 100 V.

A voltage detector 16 detects an AC voltage (system voltage) Vs of power system L1, and outputs, to control device 15, a signal indicating a detection value thereof. System voltage Vs has an effective value of about 100 V, for example.

Control device 15 is electrically connected to a power supply wiring PL2 and a ground wiring NL2. Power supply wiring PL2 supplies control device 15 with a power supply voltage Vcc lower than DC voltage Vdc. As such, power supply voltage Vcc supplied to control device 15 corresponds to a "second power supply voltage", power supply wiring PL2 corresponds to a "second power supply wiring", and ground wiring NL2 corresponds to a "second ground wiring".

Control device 15 is constituted of a microcomputer, and controls an operation of power converter 5, for example. Control device 15 operates using, as power supply voltage Vcc, a voltage much lower than voltage Vdc of DC power supply 9. Power supply voltage Vcc of control device 15 is 15 V at maximum, for example.

In the present embodiment, as a method for controlling IGBT elements Q1 to Q6, PWM (Pulse Width Modulation) control is applied. Control device 15 receives output signals of current detectors 17, 18 and voltage detectors 10, 16, and performs the PWM control, thereby generating control signals S1 to S6 for power converter 5.

The following describes a control configuration of power conversion device 2 according to the first embodiment.

Figure 2:
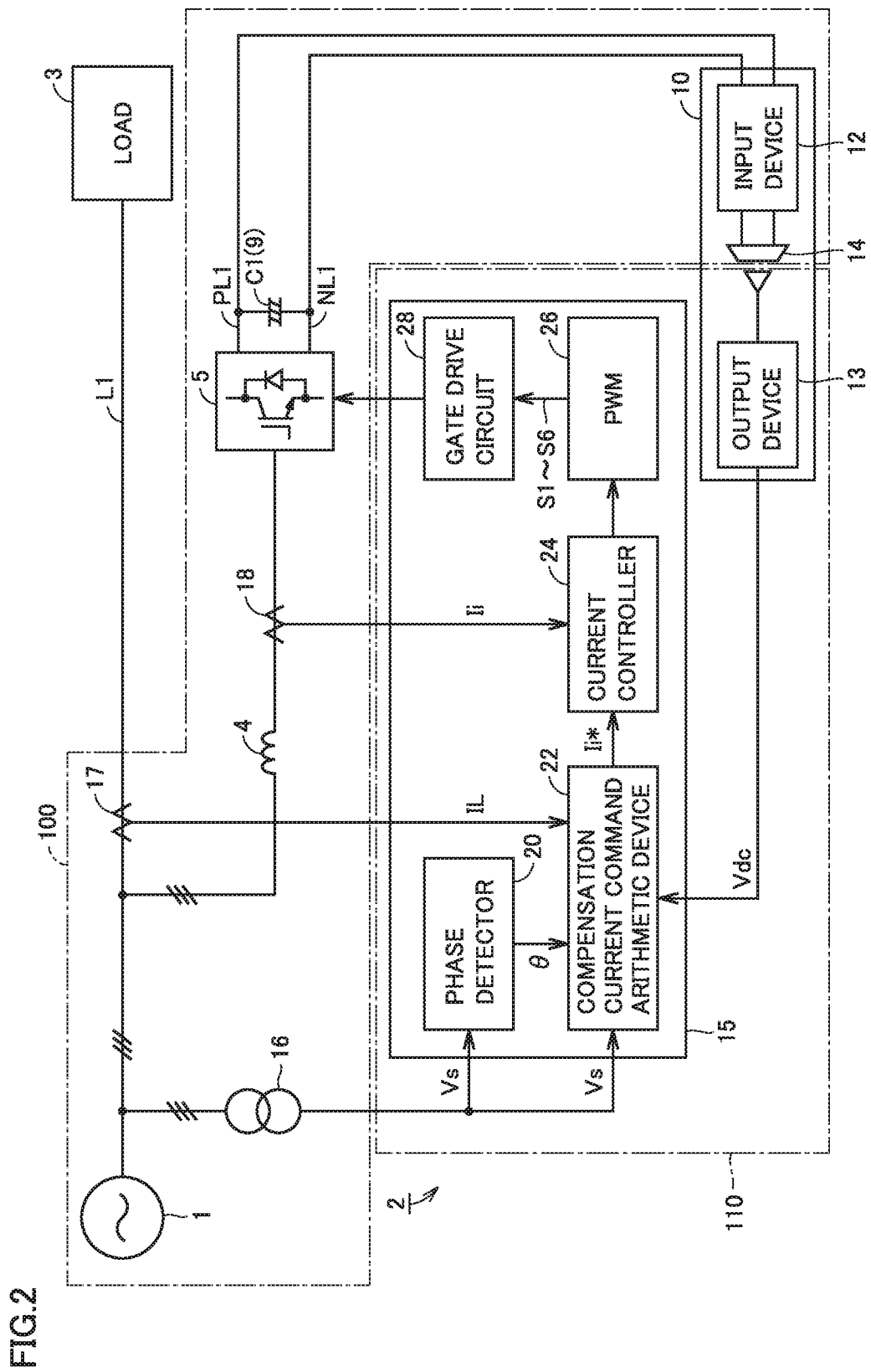
FIG. 2 is a function block diagram of a control device shown in FIG. 1.

FIG. 2 is a function block diagram of control device 15 shown in FIG. 1.

With reference to FIG. 2, control device 15 includes a phase detector 20, a compensation current command arithmetic device 22, a current controller 24, a PWM circuit 26, and a gate drive circuit 28.

Phase detector 20 calculates a phase $\theta$ of the three-phase AC voltage of power system L1 based on system voltage Vs detected by voltage detector 16. Phase detector 20 outputs the calculated phase to compensation current command arithmetic device 22.

Compensation current command arithmetic device 22 generates a compensation current command Ii* based on phase $\theta$ from phase detector 20 and DC voltage Vdc detected by voltage detector 10. Compensation current command Ii* is generated by adding a harmonic current command to a charging current command as described below. The harmonic current command is a command for canceling a harmonic component of load current IL, and the charging current command is a command for maintaining DC voltage Vdc at a predetermined voltage.

Specifically, compensation current command arithmetic device 22 first performs three-phase/two-phase conversion of three-phase load current IL using phase $\theta$ calculated by phase detector 20, so as to calculate a d-axis current Id and a q-axis current Iq. Next, compensation current command arithmetic device 22 removes a fundamental wave component from the calculated d-axis current Id and q-axis current Iq so as to find a d-axis harmonic component and a q-axis harmonic component. Then, compensation current command arithmetic device 22 performs two-phase/three-phase conversion of the d-axis harmonic component and the q-axis harmonic component using phase $\theta$ so as to calculate a three-phase harmonic component. Compensation current command arithmetic device 22 multiplies this three-phase harmonic component by "−1" to reverse the polarity, thereby generating the harmonic compensation current command.

Further, compensation current command arithmetic device 22 generates the charging current command based on DC voltage Vdc detected by voltage detector 16. Specifically, when DC voltage Vdc is equal to a predetermined voltage, the charging current command is set to 0. On the other hand, when DC voltage Vdc is lower than the above-described predetermined voltage, the charging current command is set to have a higher value as a deviation of DC voltage Vdc relative to the predetermined voltage becomes larger. It should be noted that the predetermined voltage is set to a voltage higher than the effective value of the three-phase AC voltage of power system L1 (for example, voltage of more than 100 V).

Finally, compensation current command arithmetic device 22 generates a compensation current command Ii* by adding the harmonic current compensation command and the charging current command.

Current controller 24 performs proportional integral calculation onto a deviation $\Delta$Ii of inverter current Ii detected by current detector 18 relative to compensation current command Ii*. Current controller 24 adds a calculation result thereof to a reference voltage command, thereby generating three-phase voltage commands Vu*, Vv*, and Vw*. The reference voltage command represents a voltage value of the three-phase AC voltage to be supplied by power system L1. The voltage value of the three-phase AC voltage includes only the fundamental wave component.

PWM circuit 26 performs pulse width modulation calculation for each phase based on three-phase voltage commands Vu*, Vv*, Vw* generated by current controller 24, and a carrier signal in the form of, for example, a triangular wave, thereby generating control signals (gate signals) for performing switching control for IGBT elements Q1 to Q6 included in power converter 5.

Gate drive circuit 28 supplies the gate signals generated by PWM circuit 26, to control terminals (for example, gate terminals) of IGBT elements Q1 to Q6 included in power converter 5.

As described above, control device 15 controls power converter 5 to maintain, at the predetermined voltage, DC voltage Vdc detected by voltage detector 10.

However, in the above-described control configuration, when control device 15 and power converter 5 are electrically connected to each other via voltage detector 10, switching noises generated by the IGBT elements included in power converter 5 and other noises may be introduced into control device 15 via voltage detector 10.

Particularly, when power conversion device 2 is a harmonic restraint device as in the first embodiment, each of such noises introduced in control device 15 makes it difficult to precisely detect the harmonic component of load current IL. Moreover, since the ground potential serving as the reference potential of control device 15 is fluctuated in response to an influence of the noise, the detection value of voltage detector 10, the power supply voltage of control device 15, and the like become unstable. As a result, control device 15 cannot correctly generate a compensation current for canceling the harmonic component, with the result that harmonic restraint performance may be decreased.

To address such a noise, in the first embodiment, a separation device 14 is provided inside voltage detector 10. As described below, separation device 14 has a function of separating the ground wirings from each other between a high-voltage system circuit group 100 and a low-voltage system circuit group 110. Separation device 14 corresponds to a "first isolation circuit".

Hereinafter, with reference to FIG. 2 and FIG. 3, a detailed configuration of voltage detector 10 will be described.

Figure 3:
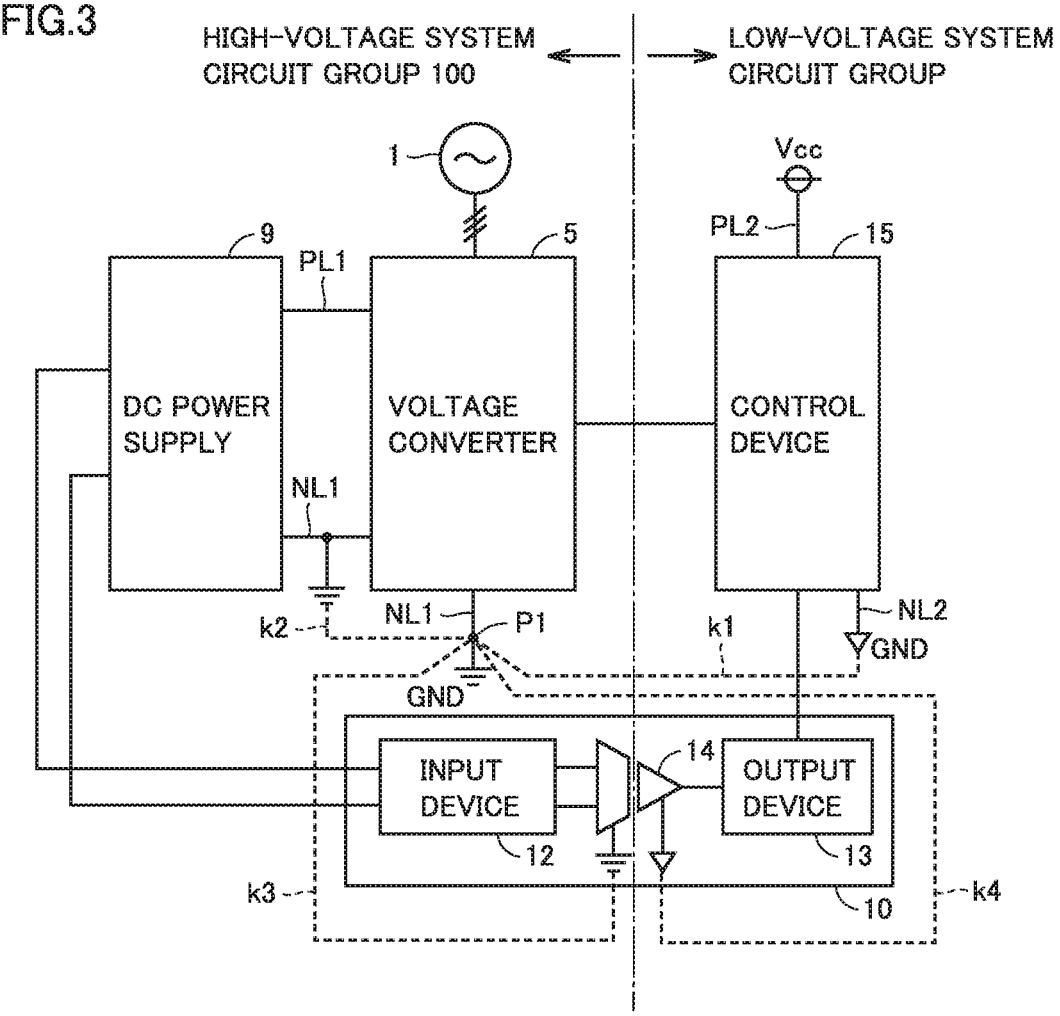
FIG. 3 illustrates a detailed configuration of a voltage detector.

As shown in FIG. 2 and FIG. 3, voltage detector 10 includes an input device 12, an output device 13, and separation device 14.

Input device 12 is connected between power supply wiring PL1 and ground wiring NL1, and receives DC voltage Vdc from DC power supply 9. Input device 12 steps down DC voltage Vdc, and outputs the stepped-down DC voltage to separation device 14. For example, input device 12 is configured to step down DC voltage Vdc of more than 100 V to a low voltage falling within a range of 0 to 5 V. Input device 12 includes a voltage dividing circuit configured to divide DC voltage Vdc at a predetermined voltage dividing ratio, for example.

As described above, power supply voltage Vcc of control device 15 is, for example, about 15 V at maximum, and is lower than DC voltage Vdc. Hence, voltage detector 10 cannot directly supply control device 15 with DC voltage Vdc between power supply wiring PL1 and ground wiring NL1. Therefore, in voltage detector 10, input device 12 steps down DC voltage Vdc to a voltage (for example, a voltage of about less than 5 V) lower than power supply voltage Vcc of control device 15.

Output device 13 amplifies the DC voltage, supplied from input device 12 via separation device 14, such that the DC voltage stably falls within a range of 0 to 5 V. Output device 13 outputs, to compensation current command arithmetic device 22 in control device 15, the amplified DC voltage as a signal indicating the detection value of DC voltage Vdc. Output device 13 includes an amplifying circuit constituted of a transistor, an operational amplifier, or the like, for example.

Separation device 14 is connected between input device 12 and output device 13. Separation device 14 includes an isolation circuit. Examples of the isolation circuit usable herein include a photo coupler, an isolated amplifier, a transformer for signal transmission, and the like. Separation device 14 transmits the DC voltage from input device 12 to output device 13 via the isolation circuit.

However, depending on characteristics of the isolation circuit, the DC voltage output from separation device 14 may be suppressed to fall within a range of 0 to 2.5 V. Also in such a case, output device 13 amplifies the output of separation device 14, thereby adjusting the signal to be supplied to control device 15 to fall within a voltage range of 0 to 5 V.

Power conversion device 2 according to the first embodiment is constituted of the following separate circuit groups: high-voltage system circuit group 100 mainly constituted of DC power supply 9 and power converter 5 and supplied with power supply voltage Vdc; and low-voltage system circuit group 110 mainly constituted of control device 15 and supplied with power supply voltage Vcc. High-voltage system circuit group 100 is electrically connected to power supply wiring PL1 and ground wiring NL1, and low-voltage system circuit group 110 is electrically connected to power supply wiring PL2 and ground wiring NL2.

Then, in the above-described configuration, ground wiring NL1 of high-voltage system circuit group 100 and ground wiring NL2 of low-voltage system circuit group 110 are separated from each other by separation device 14 provided in voltage detector 10. It should be noted that the expression "ground wiring NL1 and ground wiring NL2 are separated from each other" in the specification of the present application means that ground wiring NL1 and ground wiring NL2 are separated physically from each other.

With such a configuration, the noise generated in high-voltage system circuit group 100 is restrained from being propagated to low-voltage system circuit group 110 via ground wiring NL1 and ground wiring NL2. Accordingly, the noise can be prevented from being introduced from high-voltage system circuit group 100 to low-voltage system circuit group 110.

Further, in the first embodiment, as indicated by broken lines k1 to k4 in FIG. 3, ground wiring NL1 and ground wiring NL2 are electrically connected to each other at a single node P1. Therefore, ground wiring NL1 and ground wiring NL2 have the same electric potential.

As described above, when ground wiring NL1 and ground wiring NL2 are separated from each other, the propagation of the noise between high-voltage system circuit group 100 and low-voltage system circuit group 110 is suppressed; however, a potential difference between ground wiring NL1 and ground wiring NL2 may occur. In this case, the ground potential serving as the reference potential in high-voltage system circuit group 100 is different from the ground potential serving as the reference potential in low-voltage system circuit group 110, with the result that power conversion device 2 cannot be operated normally as a whole. As a result, when power conversion device 2 is a harmonic restraint device, it becomes difficult to maintain DC voltage Vdc at a predetermined voltage. Accordingly, a compensation current for canceling the harmonic component cannot be correctly generated, with the result that the harmonic restraint performance may be decreased.

According to the first embodiment, the potential difference between ground wiring NL1 and ground wiring NL2 can be eliminated, whereby the ground potential in high-voltage system circuit group 100 and the ground potential in low-voltage system circuit group 110 can always coincide with each other. Therefore, power conversion device 2 can be operated normally as a whole, whereby the harmonic restraint performance can be secured.

It should be noted that in the first embodiment, by electrically connecting ground wiring NL1 to ground wiring NL2 via single node P1, the noise can be restrained from being propagated between ground wirings NL1, NL2. This is due to the following reason: since respective currents (hereinafter, also referred to as "ground currents") flowing in ground wirings NL1, NL2 flow toward node P1, the ground current flowing in one ground wiring does not flow into the other ground wiring.

Here, as shown in FIG. 3, single node P1 is preferably provided on ground wiring NL1 of high-voltage system circuit group 100.

This is due to the following reason: in the case where node P1 is provided on ground wiring NL2 of low-voltage system circuit group 110, there is wiring impedance between ground wiring NL1 and node P1, so that when a large amount of ground current flows into ground wiring NL1, the voltage is decreased due to this wiring impedance, with the result that the ground potential serving as the reference potential may be fluctuated. On the other hand, in the case where node P1 is provided on ground wiring NL1, the ground current flowing in ground wiring NL2 is very small, so that an amount of decrease of the voltage between ground wiring NL2 and node P1 also becomes small, with the result that the fluctuation of ground potential GND can be suppressed.

Meanwhile, in high-voltage system circuit group 100, for example, when a failure occurs to cause short-circuit of one of IGBT elements Q1 to Q6 included in power converter 5, a very large amount of short-circuit current may flow in ground wiring NL1. Since node P1 is provided on ground wiring NL1, the short-circuit current immediately flows into node P1 and therefore does not flow into ground wiring NL2. Therefore, low-voltage system circuit group 110 can be protected from the large amount of current.

Second Embodiment

Figure 4:
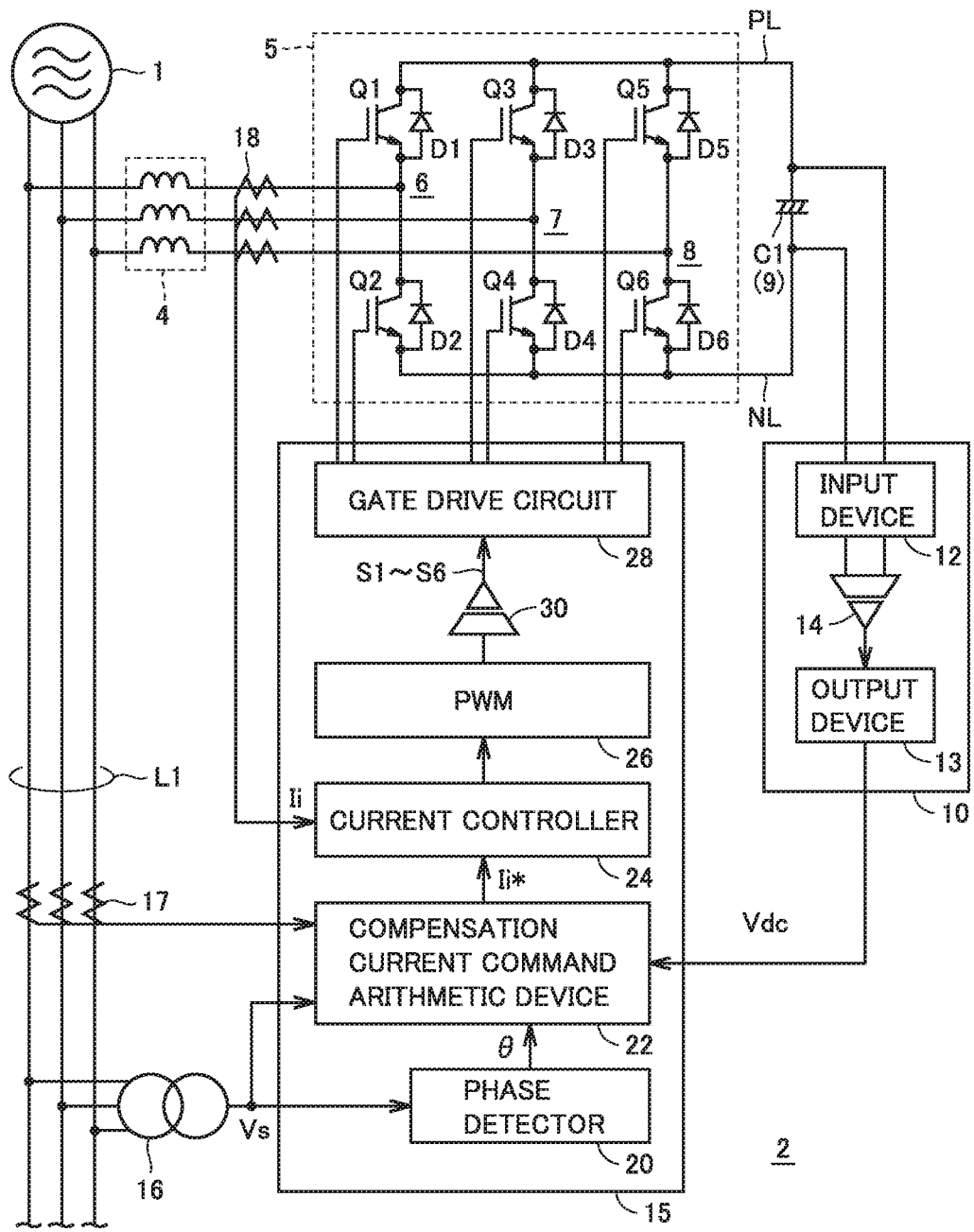
FIG. 4 is a circuit diagram showing a configuration of a power conversion device according to a second embodiment of the present invention.

FIG. 4 is a circuit diagram showing a configuration of a power conversion device according to a second embodiment of the present invention.

With reference to FIG. 4, a power conversion device 2 according to the second embodiment is obtained by adding a separation device 30 to power conversion device 2 according to the first embodiment shown in FIG. 1.

Separation device 30 is provided inside control device 15. Specifically, separation device 30 is connected between PWM circuit 26 and gate drive circuit 28. Separation device 30 includes an isolation circuit as with separation device 14. Examples of the isolation circuit usable herein include a photo coupler, an isolated amplifier, a transformer for signal transmission, and the like. Separation device 30 transmits a control signal (gate signal) from PWM circuit 26 to gate drive circuit 28 via the isolation circuit. Separation device 30 corresponds to a "second isolation circuit". PWM circuit 26 corresponds to one example of a "first control circuit", and gate drive circuit 28 corresponds to one example of a "second control circuit".

As with power conversion device 2 according to the first embodiment, power conversion device 2 according to the second embodiment is constituted of the following separate circuit groups: high-voltage system circuit group 100 supplied with power supply voltage Vdc; and low-voltage system circuit group 110 supplied with power supply voltage Vcc. High-voltage system circuit group 100 is electrically connected to power supply wiring PL1 and ground wiring NL1, and low-voltage system circuit group 110 is electrically connected to power supply wiring PL2 and ground wiring NL2. In the above-described configuration, ground wiring NL1 of high-voltage system circuit group 100 and ground wiring NL2 of low-voltage system circuit group 110 are separated from each other by separation device 14 provided in voltage detector 10.

Figure 5:
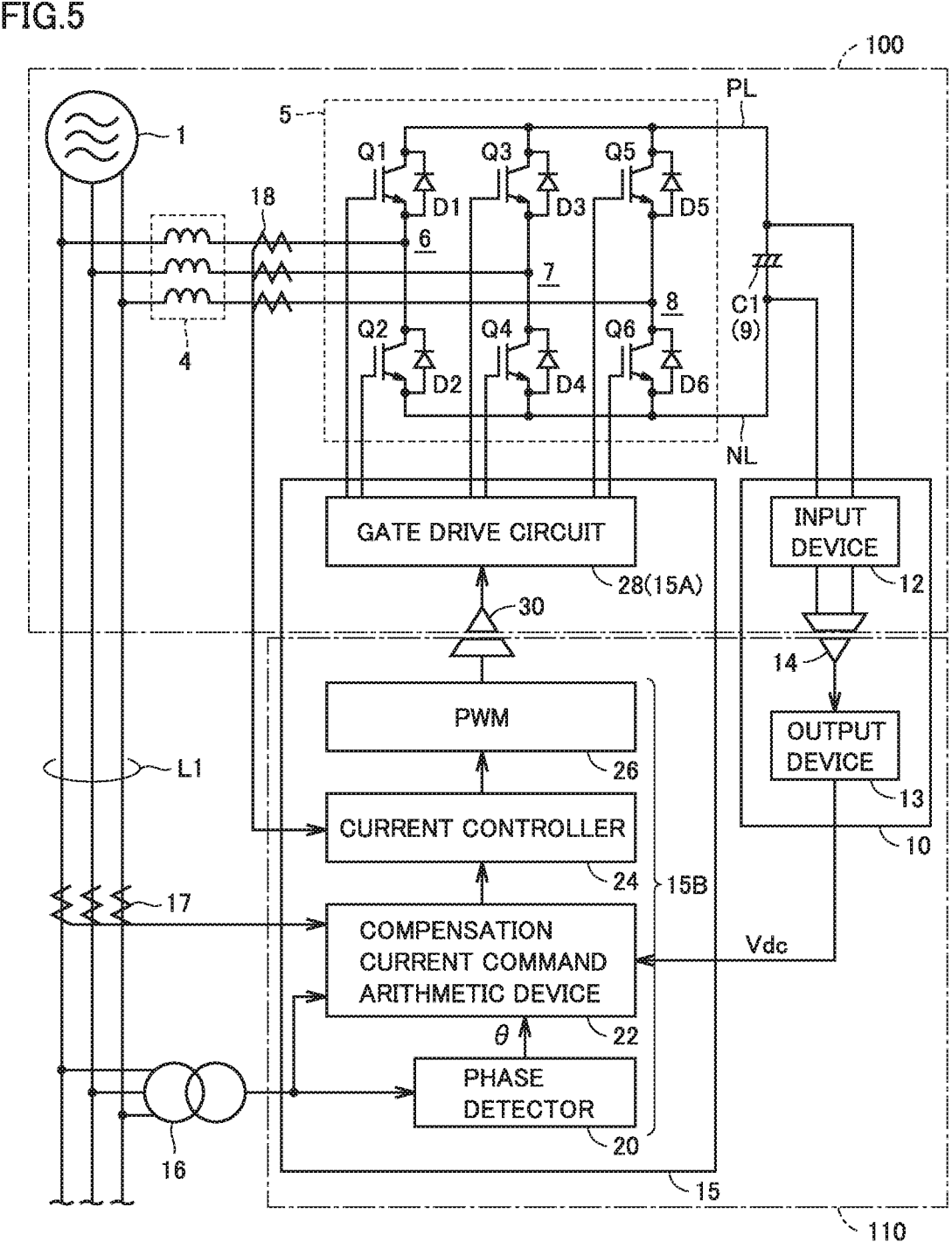
FIG. 5 is a function block diagram of a control device shown in FIG. 4.
Figure 6:
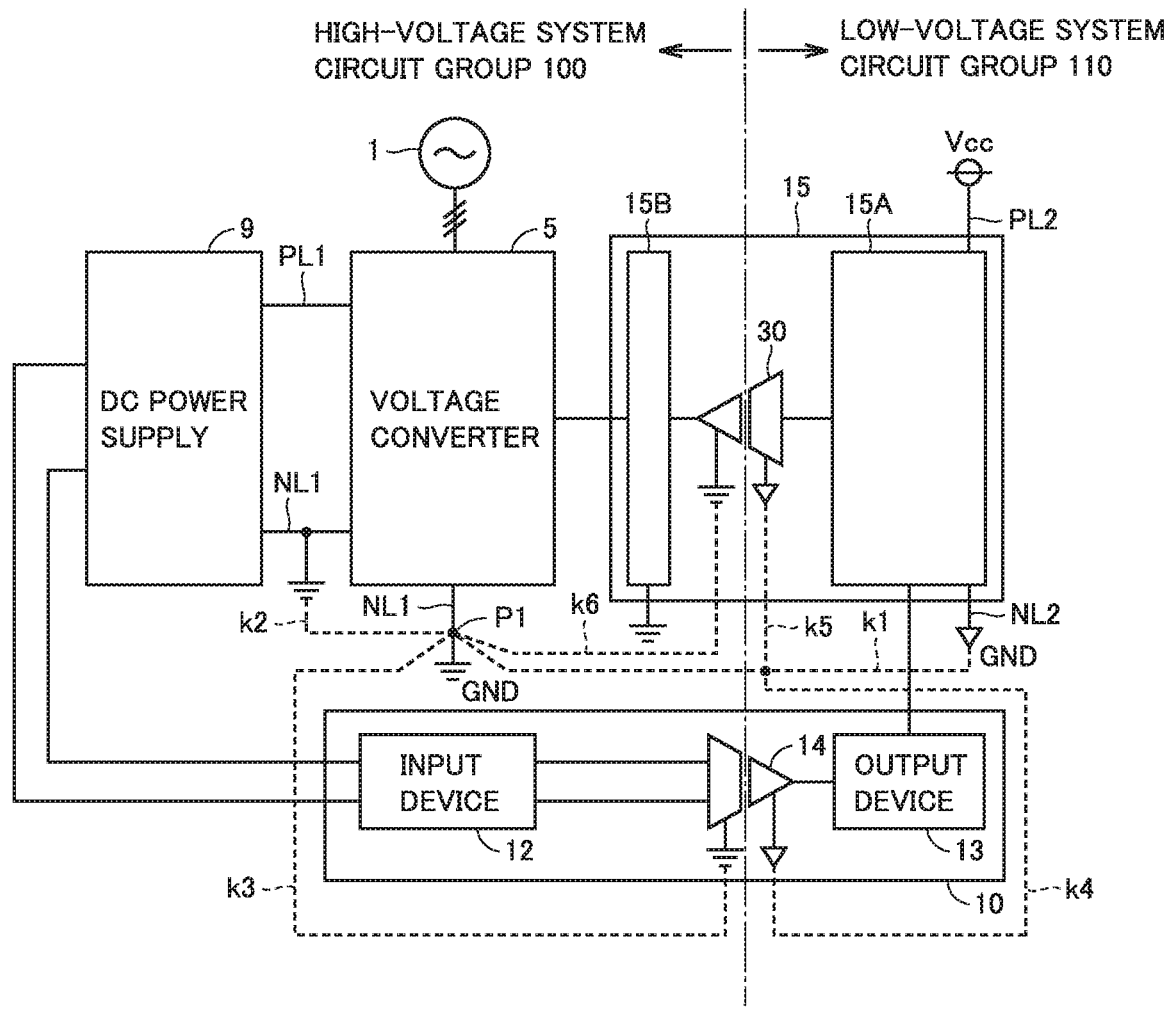
FIG. 6 illustrates a detailed configuration of the control device.

In the second embodiment, by providing separation device 30 in control device 15, the plurality of circuits included in control device 15 are further divided into the following circuit groups: a circuit group constituted of circuits that have to be disposed adjacent to a high-voltage system circuit such as power converter 5; and a circuit group constituted of circuits that are prone to be affected by noise. In FIG. 5 and FIG. 6, the former circuit group is illustrated as a high-voltage system control circuit group 15A, whereas the latter circuit group is illustrated as a low-voltage system control circuit group 15B.

As shown in FIG. 5, gate drive circuit 28 sends the gate signals generated in PWM circuit 26 to the gate terminals of IGBT elements Q1 to Q6 of power converter 5, and is therefore required to be disposed adjacent to power converter 5. Hence, gate drive circuit 28 is included in high-voltage system control circuit group 15A.

On the other hand, since PWM circuit 26, current controller 24, compensation current command arithmetic device 22, and phase detector 20 cooperate to generate the control signals for controlling the operation of power converter 5, PWM circuit 26, current controller 24, compensation current command arithmetic device 22, and phase detector 20 are required to be disposed to be separated from the high-voltage system circuit in order to avoid introduction of noise. Therefore, PWM circuit 26, current controller 24, compensation current command arithmetic device 22, and phase detector 20 are included in low-voltage system control circuit group 15B.

As shown in FIG. 5 and FIG. 6, high-voltage system control circuit group 15A is incorporated in high-voltage system circuit group 100, and low-voltage system control circuit group 15B is incorporated in low-voltage system circuit group 110. It should be noted that ground wiring NL1 and ground wiring NL2 of low-voltage system control circuit group 15B are separated from each other by separation device 30. Therefore, the noise can be prevented from being introduced from high-voltage system control circuit group 15A to low-voltage system control circuit group 15B.

It should be noted that although not shown in the figures, high-voltage system control circuit group 15A can include a protection circuit for detecting an abnormality in power converter 5 and for protecting power converter 5. It should be noted that when the protection circuit detects an abnormality of power converter 5, the protection circuit controls power converter 5 to cut off the gates of all of IGBT elements Q1 to Q6 (turn off all of them).

Further, also in the second embodiment, as with the first embodiment, as indicated by broken lines k1 to k6 in FIG. 6, ground wiring NL1 and ground wiring NL2 are electrically connected to each other at single node P1. Preferably, single node P1 is provided on ground wiring NL1 of high-voltage system circuit group 100. Accordingly, ground potential GND in each of high-voltage system circuit group 100 and high-voltage system control circuit group 15A can always coincide with ground potential GND in each of low-voltage system circuit group 110 and low-voltage system control circuit group 15B. Accordingly, power conversion device 2 is guaranteed to operate normally, whereby the harmonic restraint performance can be secured.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: AC power supply; 2: power conversion device; 4: reactor; 5: voltage converter; 6: U phase arm; 7: V phase arm; 8: W phase arm; 9: DC power supply; 10: voltage detector; 12: input device; 13: output device; 14, 30: separation device; 15: control device; 15A: high-voltage system control circuit group; 15B: low-voltage system control circuit group; 16: voltage detector; 17, 18: current detector; 20: phase detector; 22: compensation current command arithmetic device; 24: current controller; 26: PWM circuit; 28: gate drive circuit; 100: high-voltage system circuit group; 110: low-voltage system circuit group; PL1, PL2: power supply wiring; NL1, NL2: ground wiring; L1: power system; Q1 to Q6: IGBT element; D1 to D6: diode.

The invention claimed is:
1. A power conversion device comprising:
a DC power supply connected between a first power supply wiring and a first ground wiring;
a power converter configured to convert, into an AC voltage, a first power supply voltage between the first power supply wiring and the first ground wiring;
a control device connected between a second power supply wiring and a second ground wiring, the second power supply wiring being configured to supply a second power supply voltage lower than the first power supply voltage, the control device configured to control the power converter; and
a separation device configured to physically separate the first ground wiring and the second ground wiring from each other,
wherein the first ground wiring is electrically connected to a reference potential via a single node,
wherein the second ground wiring is electrically connected to the reference potential via the single node,
wherein an electric potential of the single node is lower than electric potentials of the first ground wiring and the second ground wiring, and
wherein the first ground wiring is electrically connected to the second ground wiring at the single node provided on the first ground wiring, current flowing through the first ground wiring and the second ground wiring flowing toward the single node.

2. The power conversion device according to claim 1, further comprising
a voltage detector configured to detect a voltage of the DC power supply,
wherein the voltage detector includes:
an input device connected between the first power supply wiring and the first ground wiring, the input device being configured to step down the voltage of the DC power supply, and
an output device connected between the second power supply wiring and the second ground wiring, the output device being configured to output, to the control device, the voltage sent from the input device; and
wherein the separation device includes a first isolation circuit connected between the input device and the output device.

3. The power conversion device according to claim 1, wherein the control device includes:
a first control circuit connected between the first power supply wiring and the first ground wiring, and
a second control circuit connected between the second power supply wiring and the second ground wiring, the second control circuit being configured to exchange a signal between the first control circuit and the power converter; and
wherein the separation device includes a second isolation circuit connected between the first control circuit and the second control circuit.

4. The power conversion device according to claim 3, wherein:
the power converter includes a plurality of switching elements electrically connected between the first power supply wiring and the first ground wiring,
the first control circuit includes a circuit configured to generate a control signal for controlling a switching operation of each of the plurality of switching elements, and
the second control circuit includes a circuit configured to drive each of the plurality of switching elements in accordance with the control signal.

5. The power conversion device according to claim 1, further comprising:
a high-voltage system circuit group grounded by the first ground wiring, the high-voltage system circuit group being configured to receive the first power supply voltage to operate; and
a low-voltage system circuit group grounded by the second ground wiring, the low-voltage system circuit group being configured to receive the second power supply voltage to operate,
wherein the high-voltage system circuit group includes the DC power supply and the power converter, and
wherein the low-voltage system circuit group includes the control device.

6. A harmonic restraint device comprising the power conversion device recited in claim 1,
wherein the power converter is connected to a load via a power system, and
wherein the control device is configured to operate the power converter to output, to the power system, a compensation current having a polarity opposite to a polarity of a harmonic component of a current flowing in the load.

7. The power conversion device according to claim 1,
wherein the current flowing through the first ground wiring and the second ground wiring flowing toward the single node is positive and negative current.

* * * * *